(12) United States Patent
Spence et al.

(10) Patent No.: US 8,893,442 B1
(45) Date of Patent: Nov. 25, 2014

(54) SEGMENTED DEPLOYABLE BOOM STRUCTURE FOR SPACE APPLICATIONS

(75) Inventors: Brian R. Spence, Solvang, CA (US); Steve F. White, Ventura, CA (US); Mark V. Douglas, Ventura, CA (US); Kevin B. Schmid, Santa Barbara, CA (US); Donald G. R. Carter, Santa Paula, CA (US)

(73) Assignee: Deployable Space Systems, Inc., Goleta, CA (US)

( * ) Notice: Subject to any disclaimer, the term of this patent is extended or adjusted under 35 U.S.C. 154(b) by 0 days.

(21) Appl. No.: 13/590,135

(22) Filed: Aug. 20, 2012

Related U.S. Application Data

(60) Provisional application No. 61/526,615, filed on Aug. 23, 2011.

(51) Int. Cl.
*E04C 3/00* (2006.01)
*B64G 1/22* (2006.01)

(52) U.S. Cl.
USPC .............................. 52/108; 52/2.11; 52/653.2

(58) Field of Classification Search
USPC ........................................ 52/108, 2.11, 653.2
See application file for complete search history.

(56) References Cited

U.S. PATENT DOCUMENTS

| | | | |
|---|---|---|---|
| 2,905,282 A * | 9/1959 | Miller .............................. | 52/108 |
| 3,387,414 A * | 6/1968 | Adams ............................ | 52/108 |
| 3,503,164 A * | 3/1970 | Medal Einar et al. .......... | 52/108 |
| 3,508,587 A * | 4/1970 | Mauch ........................... | 138/119 |
| 3,811,633 A * | 5/1974 | Cummings et al. ............ | 226/172 |
| 5,235,788 A * | 8/1993 | Maimets ......................... | 52/108 |
| 6,217,975 B1 * | 4/2001 | Daton-Lovett ................ | 428/105 |
| 6,256,938 B1 * | 7/2001 | Daton-Lovett ................. | 52/108 |
| 6,343,442 B1 * | 2/2002 | Marks ............................. | 52/71 |
| 6,374,565 B1 * | 4/2002 | Warren ......................... | 52/653.2 |
| 6,920,722 B2 * | 7/2005 | Brown et al. .................. | 52/108 |
| 2003/0182878 A1 * | 10/2003 | Warren ........................... | 52/108 |
| 2005/0022465 A1 * | 2/2005 | Warren et al. ................ | 52/653.2 |
| 2010/0319270 A1 * | 12/2010 | Slade ............................... | 52/71 |

* cited by examiner

*Primary Examiner* — Adriana Figueroa
(74) *Attorney, Agent, or Firm* — R. Scott Kimsey, Esq.; Klein DeNatale Goldner

(57) ABSTRACT

A long, elastically deployable tubular boom structure consisting of two or more thin-walled booms with a continuous longitudinal slit-opening along its entire length on the backside and a composite reinforced or metallic construction. The slit-opening, thin-walled tubular section accompanied by the boom elastic properties and unique fastening method between the boom segments allows the segmented boom to be flattened and then rolled up into an extremely compact cylindrical stowage volume. The boom elastically and immediately deploys from a rolled stowed configuration under its own strain energy without use of a motor or other complicated actuators/mechanisms. The segmented construction of multiple tube elements allows for unlimited boom lengths and enables unlimited structure scaling. In addition, the segmented slit-boom construction minimizes the overall boom cost and allows for tailoring of the boom stiffness along its length and facilitates repair of the boom if a material flaw is identified or localized damage occurs.

14 Claims, 4 Drawing Sheets

SEGMENTED DEPLOYABLE BOOM STRUCTURE FOR SPACE APPLICATIONS

FIELD OF THE INVENTION

The present invention relates to deployable space structures and booms, and more particularly to the practical, affordable, modular, and segmented construction of extremely long length deployable structures and booms that also stow into a compact volume.

BACKGROUND OF THE INVENTION

Spacecraft systems, which include earth and planetary orbiting satellites and deep space probes, often incorporate deployable systems including; Deployable structures, deployable solar arrays, deployable antennas, and other deployable subsystems. These deployable systems must be configurable between a storage configuration that enables the entire spacecraft system, inclusive of the deployable structure, to fit within the small volume constraints of a launch vehicle, and a deployed operable configuration that enables the spacecraft to function in a desired manner once in space.

Once the spacecraft is in space, the spacecraft is typically configured for use by deploying an assembly of extendable deployable components. For example, the assembly of extendable components may comprise an extended solar panel or blanket array that is used to convert collected solar radiation into electrical energy. In another example, the assembly of extendable components may comprise an extendable antenna assembly that is used to transmit and receive electromagnetic signals to and from a plurality of earth-based installations. In yet another example, the assembly of extendable components may comprise an extendable boom assembly that is used as a platform for a critical sensor, such as a magnetometer or electric field sensor.

The deployable boom assemblies are required to compactly stow into a small volume and then reliably deploy in a known kinematic manner to form a rigid and strong appendage. The boom assemblies must also be lightweight so they can be launched into space, and low cost so they can be affordable to the program. As increasingly advanced types of spacecraft are being developed, it has become apparent that currently boom technologies are insufficient for meeting emerging applications. In particular, current boom assemblies are not scalable to very long lengths and this limits a spacecraft's capability, particularly for emerging missions that demand a much longer boom length to provide much higher power production from a solar array, or a much broader aperture for an antenna.

Typical state-of-the-practice continuous-piece construction booms range from 2 meters to 10 meters in length. Continuous length booms of very long lengths are extremely difficult to manufacture using current state-of-the-practice technologies due to fabrication, material and facility limitations. For applications much longer than 10 meters in length articulated booms structures are commonly used. Articulating booms structures are typically comprised of multiple and complex articulated deploying elements that can be integrated in a repetitive manner to form a desired boom length. The articulated boom technology is high cost, high mass, and labor intensive to manufacture.

To minimize mass, maximize strength and stiffness, enable future missions, and significantly reduce cost there is a need for simple, near continuous piece construction, boom assemblies that can be scaled from 2 meters in length to literally hundreds of meters in length. Moreover, since cost and reliability are major considerations in the design of spacecraft system, it is imperative for the boom assembly to have a simple, reliable design so as to reduce the manufacturing costs of the boom assembly.

Hence, there is a continuing need for extendable boom assemblies for spacecraft that are lightweight and are readily stowable into a compacted storage configuration for launch of the spacecraft, and scalable to hundreds of meters in length. The boom assembly should also be readily deployable into an extended configuration upon the spacecraft reaching a desired trajectory and have sufficient strength and stiffness to maintain spacecraft components in a desired deployed configuration.

SUMMARY OF THE INVENTION

The aforementioned needs are satisfied by the spacecraft boom assembly of the present invention comprising a very-long integrated boom structure that is composed of multiple, segmented, open-section tubular boom elements that are mechanically attached/spliced at overlapping discrete locations with mechanical fasteners or adhesives.

The segmented boom elements are thin-walled composite reinforced, or metallic, elastically-deployable tubes with a longitudinal slit-opening down the entire backside of the segmented tube length. The slit-tube and thin-walled elastic nature of the segmented boom assembly allows it to be flattened, and then subsequently rolled up into an extremely compact cylindrical stowage volume.

Deployment of the segmented boom assembly is driven by the strain energy of the compactly stowed configuration. The segmented boom assembly elastically and immediately deploys under its own strain energy without the use of a motor or other complicated actuators/mechanisms. Since the segmented boom assembly is primarily composed of extremely minimal ultra-lightweight structural elements it does not have significant parasitic mass associated with the burdening mechanisms typically required for more complex articulated deployable structures, thereby creating an ultra-lightweight deployable structure assembly. The novel elastically deployable segmented boom technology requires no hinges, complicated synchronization, brakes, motors, or any other mechanism complexity making it inherently more reliable than existing articulated and multi-component boom systems.

The segmented construction allows for the creation of practically unlimited boom lengths. In addition, the segmented construction also allows for replacement of an individual boom segment in the event a portion of the boom becomes damaged. The modular construction greatly reduces program delays and costs should an anomaly occur during boom structure testing.

For large space structure applications boom lengths greater than 8 meters are needed. As such, boom modularity features are required for scale-up to potentially allow for unlimited boom lengths enabling unlimited structure scaling. A one-piece co-cured continuous length construction fabricated via an out-of-autoclave process could be used to fabricate such large/long structures, but it would be at great cost due to the special tooling and processes required. Another technique which is the subject of this technology embodiment is the simple segmentation of individual mass-produced boom elements to create a connected and integrated very-long structure.

The segmented design construction of the proposed embodiment also allows for shorter, more affordable, booms to be mass produced, and then integrated together to ultimately provide an affordable very-long assembled structure.

The boom assembly segments are relatively easy to manufacture for short lengths using typical autoclave composite structures manufacture processes. Boom lengths from 6 meters to 12 meters long are nominally some manufactures' limits for autoclave manufacturing. The segmented approach allows for traditional short-length manufacture processes to be implemented with existing equipment, whereby the very long boom embodiment is constructed with discretely-connected multiple segments.

In addition, the segmented boom design allows for optimization of boom's deployed stiffness and strength performance. Boom segments at the root/base react greater deployment loads than other boom segments and can be made thicker or with higher modulus/strength laminates. The laminate configuration of the various boom segments can be tailored to achieve the system level stiffness, strength and mass goals. The proposed boom construction embodiment is enabling for the construction of very-long structures allowing for high modularity, affordability and optimization of the structure mechanical/physical properties.

A segmented deployable boom structure for space applications is described and claimed. The structure comprises at least one boom segment. The template of the boom segment is substantially rectangular, with a length, a width and at least one shaped end. The boom segment is operable for being rolled along a width-wise axis for stowage and a lengthwise axis for deployment such that the lengthwise deployment configuration is tubular with a lengthwise slit opening. The boom segment is further operable for storage of elastic energy when rolled along the width-wise axis for the stowed configuration. When released upon deployment, the elastic energy urges the boom segment into a length-wise tube for the deployed configuration. The shaped end is symmetric with respect to the lengthwise axis, and angled with respect to the widthwise axis.

The segmented deployable boom structure may have any practical combination of the following attributes:
1. It may be made of composite reinforced construction or of metallic construction.
2. It may have at least two boom segments that are splicably connected at their respective shaped ends. The spliced region may be a nested overlap of the shaped ends, wherein the nested overlap is secured such that the boom segments are operable as a single continuous elongated boom.
3. The shaped ends may be tailored by the incorporation of a cut-out pattern to control the stiffness and parasitic mass.
4. The connective continuity in the spliced region may be maintained by mechanical means or by adhesive bonding.

These features and advantages of the present invention will become more apparent from the following description taken in conjunction with the accompanying drawings.

DESCRIPTION

Description of Items in the Figures

101—Topside Segmented Deployable Boom Assembly: The entire topside interconnected segmented deployable boom assembly comprised of multiple boom elements (102, 103, and any number of additional boom elements) that are segmented together in series at discrete segmenting regions (104) to create any desired lengths.
102—Single Boom Element: Elastically deployable boom elopement
103—Another Single Boom Element: Another elastically deployable boom element that is interconnected to an adjacent boom element at a single end or at both ends
104—Segmenting Regions: Discrete regions onto which two or more boom elements (102, 103 pictured) overlap and become interconnected to form the Segmented Deployable Boom Assembly structure.
105—Longitudinal Slit: A longitudinal slit along the underside of the entire Segmented Deployable Boom Assembly. The slit allows the elastic Segmented Boom Assembly to be completely flattened and then rolled to occupy a compact stowage.
106—Longitudinal Mechanical Grommet Attachment: One or more longitudinally oriented mechanical grommet attachment fastener for joining adjacent Boom Elements (102, 103) together.
107—Cutout Features: Multiple cutout Features in Boom Element Structures (102, 103) at the Segmenting Regions (104) purposely designed to reduce mass, deployment torque when deploying through those regions, while maintaining high strength and stiffness.
108—Circumferential Mechanical Grommet Attachment: One or more circumferentially oriented mechanical grommet attachment fastener for joining adjacent Boom Elements (102, 103) together.

DETAILED DESCRIPTION OF THE PREFERRED EMBODIMENT

Figure 1:
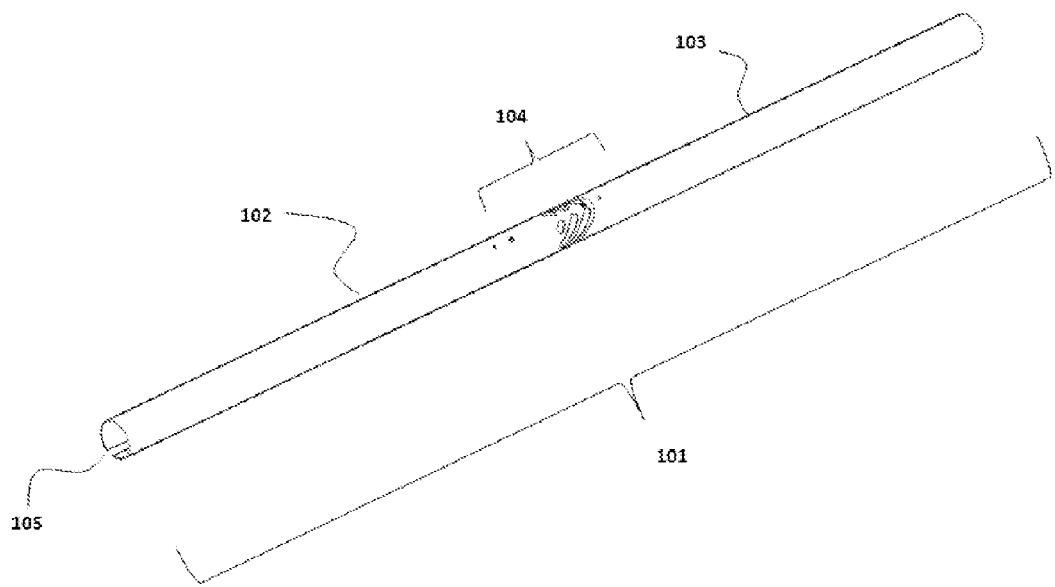
FIG. 1: Is a topside deployed perspective view of the Segmented Deployable Boom Assembly (101), showing interconnected Boom Elements (102, 103), the Splice Region (104) onto which the Boom Elements (102, 103) overlap and become interconnected, and the Longitudinal Slit (105) that runs along the entire backside of the structure length.
Figure 2:
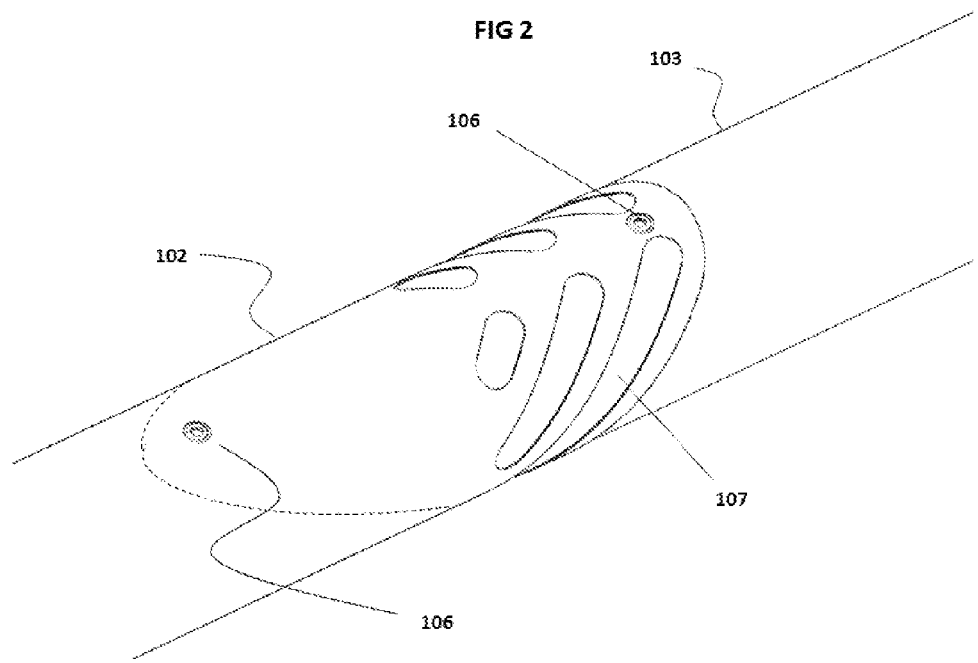
FIG. 2: Is a topside deployed perspective close-up view of the Splice Region (104) of the Segmented Deployable Boom Assembly (101), showing interconnected boom elements (102, 103), and a Longitudinal Mechanical Grommet Attachment (106) means of joining adjacent Boom Elements (102, 103) together.
Figure 3:
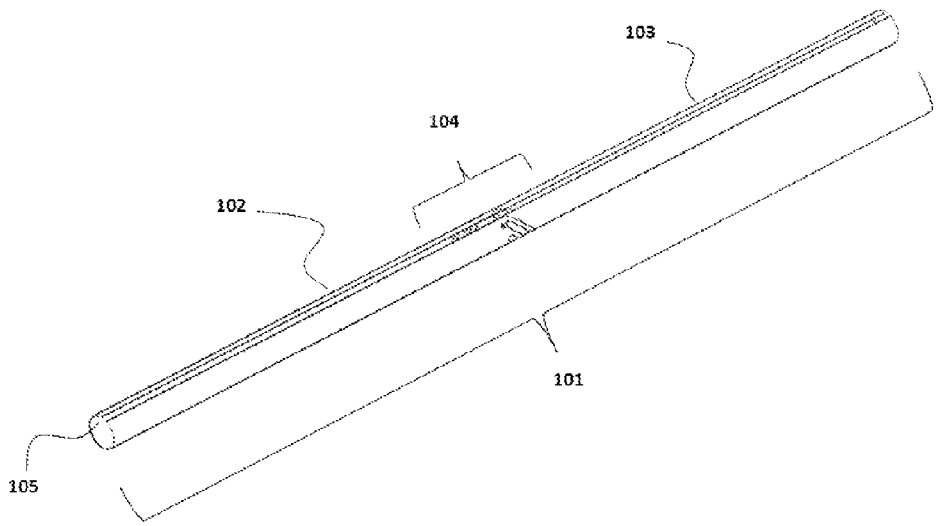
FIG. 3: Is a backside deployed perspective view of the Segmented Deployable Boom Assembly (101), showing interconnected Boom Elements (102, 103), the Splice Region (104) onto which the Boom Elements (102, 103) overlap and become interconnected, and the Longitudinal Slit (105) that runs along the entire backside of the structure length.
Figure 4:
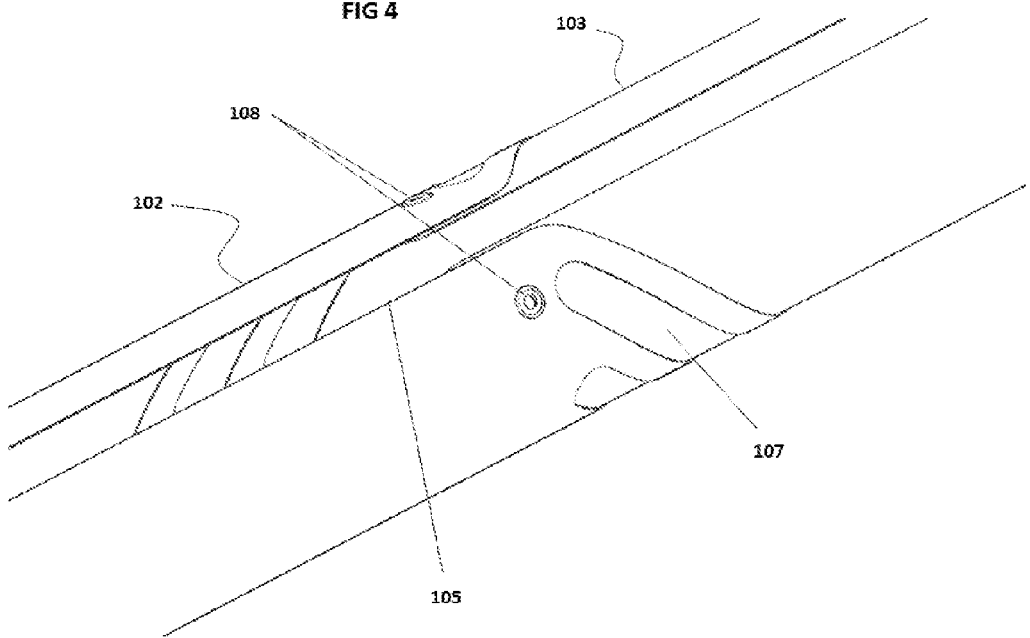
FIG. 4: Is a backside deployed perspective close-up view of the Splice Region (104) of the Segmented Deployable Boom Assembly (101), showing interconnected boom elements (102, 103), and a Longitudinal Mechanical Grommet Attachment (106) means of joining adjacent Boom Elements (102, 103) together, and a Circumferential Mechanical Grommet Attachment (108) means of joining adjacent Boom Elements (102, 103) together.
Figure 5:
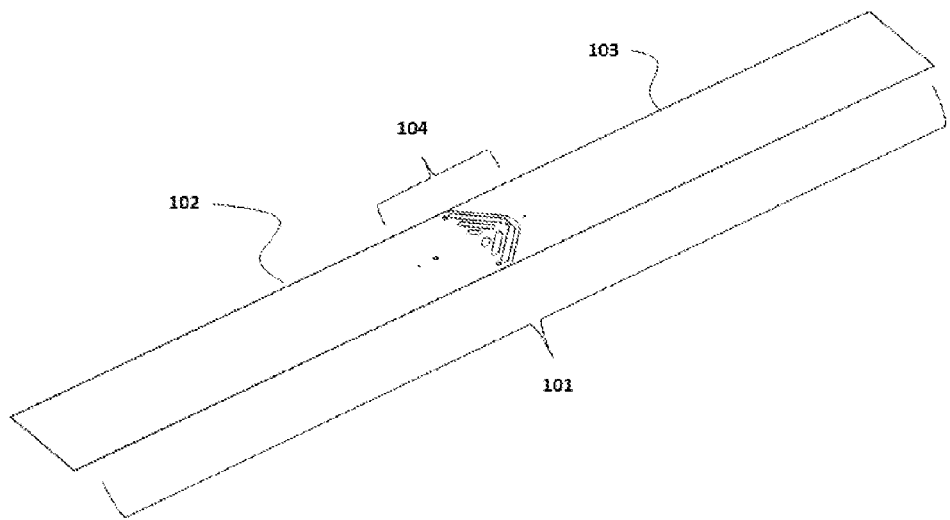
FIG. 5: Is a topside perspective view of the Segmented Deployable Boom Assembly (101) in a flattened state, showing interconnected Boom Elements (102, 103), and the Splice Region (104) onto which the Boom Elements (102, 103) overlap and become interconnected.
Figure 6:
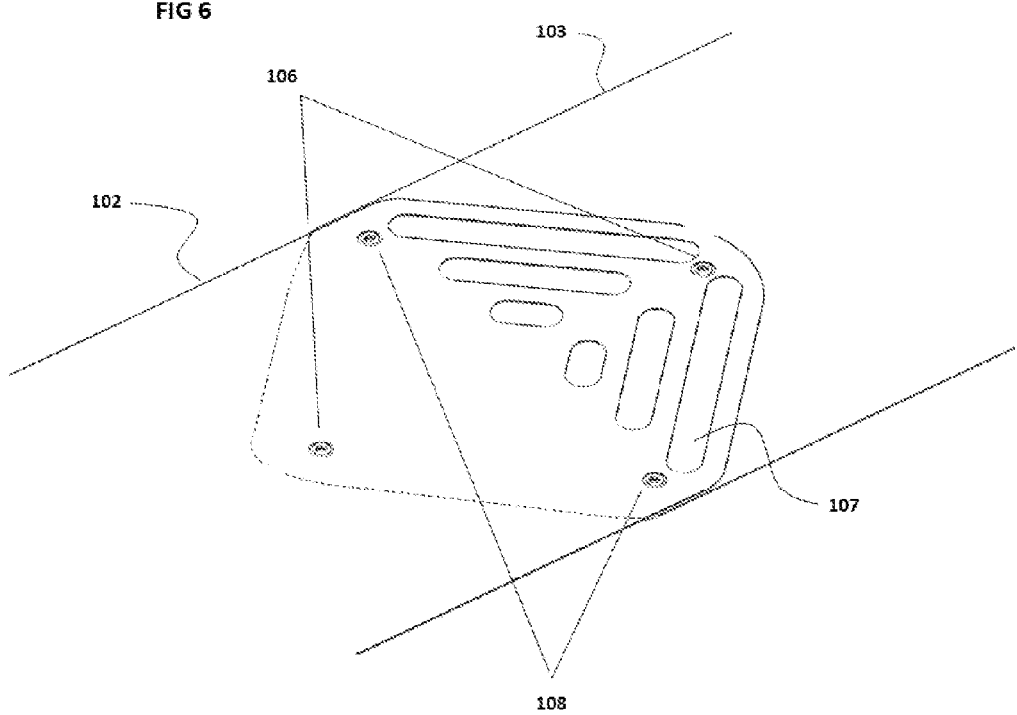
FIG. 6: Is a topside perspective close-up view of the Splice Region (104) of the Segmented Deployable Boom Assembly (101) in a flattened state, showing interconnected boom elements (102, 103), Longitudinal Mechanical Grommet Attachments (106) and Circumferential Mechanical Grommet Attachments (108) as the means of joining adjacent Boom Elements (102, 103) together, and Cutout Features (107).
Figure 7:
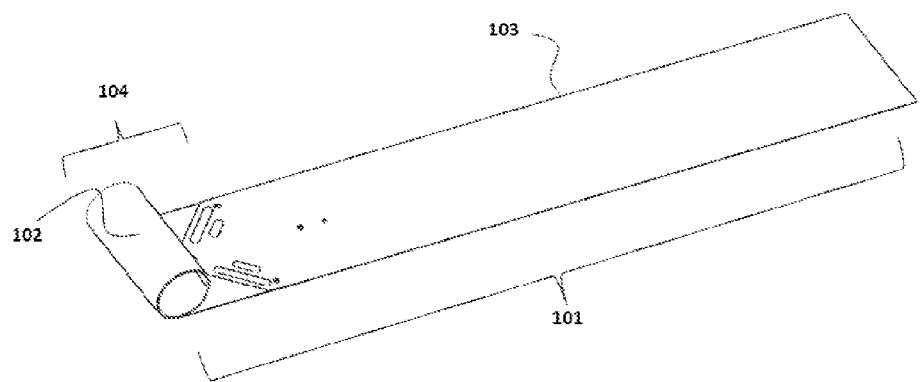
FIG. 7: Is a topside perspective view of the Segmented Deployable Boom Assembly (101) in a flattened state being rolled for stowage or being unrolled for deployment, showing the interconnected Boom Elements (102, 103), and the Splice Region (104) onto which the Boom Elements (102, 103) overlap and become interconnected.
Figure 8:
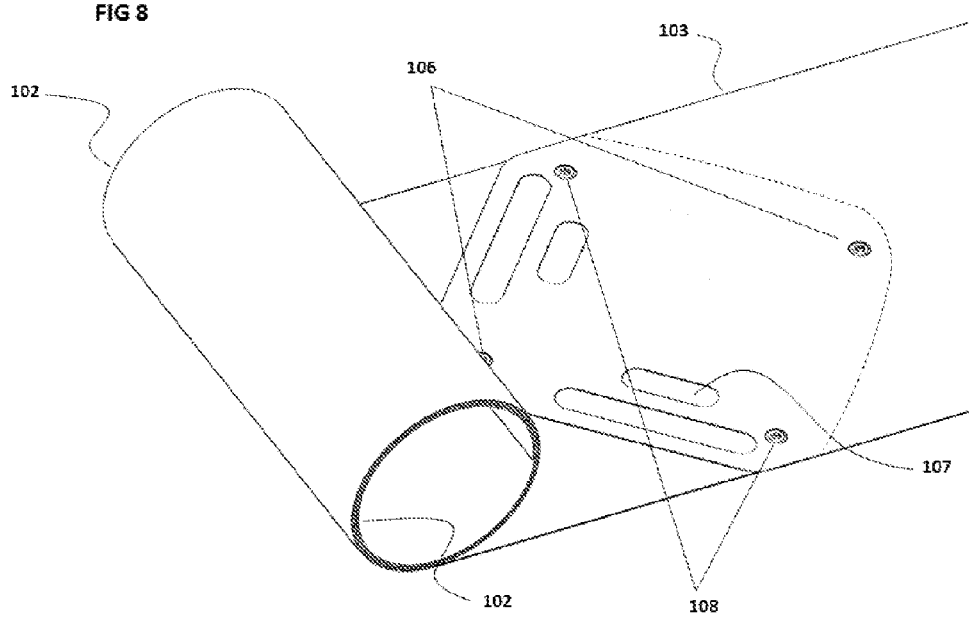
FIG. 8: Is a topside perspective close-up view of the Segmented Deployable Boom Assembly (101) in a flattened state being rolled for stowage or being unrolled for deployment, showing the interconnected Boom Elements (102, 103), Longitudinal Mechanical Grommet Attachments (106) and Circumferential Mechanical Grommet Attachments (108) as the means of joining adjacent Boom Elements (102, 103) together, and Cutout Features (107).

In the preferred embodiment, the segmented construction consists of multiple longitudinal and circumferential attachments within the overlapping splice region of the adjacent and contacting boom elements. Alternatively, attachments of the boom segments could occur through a continuous adhesive bond layer or discrete bonds. The combination of multiple longitudinal and circumferential attachments within the spliced region maintains the boom stiffness and minimizes the potential for local buckling within the region similar to a continuous co-cured boom. For mechanical attachments, the attachments at the overlapping splice region must be match drilled/located when the segmented booms are in the flattened state in order to allow for rolling/stowage. In the preferred embodiment the attachments are low profile fasteners, rivets, grommets, high-strength adhesive connections, or other. Mechanical attachments consisting of rivets, grommets or other low-profile-expandable fasteners maintain the stiffness of the joint, eliminate hysteresis and may be removed to replace a boom segment if required. To allow for rollability for stowage, the splice attachment must be performed in the flattened state of the booms. The ends of the adjoining boom elements may be tapered and cutouts of the boom elements in the region of the splice attachment may be added to tailor the torque profile of the structure during rolling and unrolling. Upon deployment the boom elements deploy to their open section shape and the integrated/connected structure provides exceptional torsional and bending stiffness (as an integrated connected structure) with performance near that of a single component tube structure.

The spacecraft boom assembly of the present invention is formed from an improved structural element that is both flattenable and rollable so as to enable the boom assembly to be easily folded into a storage configuration so that the boom assembly can be stowed within the relatively small payload space of a launching vehicle. Furthermore, since the structural system comprise of segmented structural elements are formed of a resilient material, the elastic energy stored within each segment provides a positive bias that urges the boom assembly to unroll from the storage configuration to the deployed configuration. Moreover, the structural system comprised of multiple segmented structural elements, when in the deployed configuration, provide sufficient rigidity so that the boom assembly is capable of supporting extending components of the spacecraft in order to meet system level stiffness and strength requirements. Attachment of open-section tube segments as described herein reduces cost, allows for structure stiffness and strength optimization, enhances repairability and enables structures of very long length to be fabricated.

The invention claimed is:

1. A segmented deployable boom structure for space applications comprising:
    a. at least one boom segment of said segmented deployable boom structure, said boom segment having a template that is substantially rectangular, with a length, a width, and first and second opposing side edges, the first and second opposing side edges sloping toward one another at an end of the boom segment; and;
    b. a cut out portion defined in the region of the sloping ends for tailoring the stiffness of said region,
    c. wherein said boom segment has a rolled configuration for stowage and a deployed configuration the boom being rolled along a widthwise axis in the rolled configuration and extended along a lengthwise axis in the deployed configuration, the deployed configuration being tubular with a lengthwise slit opening, the boom segment forming a tapered end when in the rolled configuration;
    d. wherein said boom segment stores elastic energy in said rolled configuration, and the elastic energy released upon deployment of said boom segment such that said boom segment is urged into said deployed configuration; and
    e. wherein the at least one shaped tapered end is configured to overlap with a tapered end of a second boom segment.

2. A segmented deployable boom structure as in claim 1 wherein the boom segment is of composite reinforced construction.

3. A segmented deployable boom structure as in claim 1 wherein the boom segment is of metallic construction.

4. A segmented deployable boom structure as in claim 2, further comprising:
    a. at least two boom segments, wherein said at least two boom segments are connected by splicing at their respected tapered ends to form a spliced region;
    b. wherein the spliced region comprises a nested overlap of said tapered ends, said nested overlap being secured such that the boom segments are operable as a single continuous elongated boom.

5. A segmented deployable boom as in claim 4, wherein the connective continuity in said spliced region is maintained by mechanical means.

6. A segmented deployable boom as in claim 4, wherein the connective continuity in said spliced region is maintained by adhesive bonding.

7. A segmented deployable boom structure as in claim 3, further comprising:
    a. at least two boom segments, wherein said at least two boom segments are connected by splicing at their respected tapered ends to form a spliced region;
    b. wherein the spliced region comprises a nested overlap of said tapered ends, said nested overlap being secured such that the boom segments are operable as a single continuous elongated boom.

8. A segmented deployable boom structure as in claim 3, further comprising a cut-out pattern in the region of said tapered ends, the cut-out pattern tailoring the stiffness of said region of the segmented boom structure.

9. A segmented deployable boom structure as in claim 8, wherein the connective continuity in said spliced region is maintained by a mechanical means.

10. A segmented deployable boom structure as in claim 8 wherein the connective continuity in said spliced region is maintained by adhesive bonding.

11. A segmented deployable boom structure for space applications comprising:

a boom segment having first and second opposing ends, a rolled configuration and a deployed configuration, the boom segment being flat and rolled along a widthwise axis in the rolled configuration and tubular and extended along a lengthwise axis in the deployed configuration;

a first longitudinal grommet attached to said boom segment;

a second longitudinal grommet attached to said boom segment and distal to the first longitudinal grommet along a longitudinal axis of said boom segment;

a first circumferential grommet attached to said boom segment; and a second circumferential grommet attached to said boom segment and distal to the first circumferential grommet along a widthwise axis of said boom segment, wherein said boom segment stores elastic energy in the rolled configuration, the elastic energy effecting extension of the boom segment to the deployed configuration as the elastic energy is released, and further wherein at least one of the first and second opposing ends is tapered and sized and shaped to receive an end of a second boom segment.

12. The deployable boom structure according to claim 11 further comprising a cutout portion defined in the boom segment substantially near at least one of the first and second ends, the cutout portion defining a torque profile of the boom segment at the region of the cutout portion.

13. The deployable boom structure according to claim 11 wherein the boom segment is a first boom segment and further comprising:

a second boom segment attached to the first boom segment by the first and second longitudinal grommets and the first and second circumferential grommets segment, the second boom segment having first and second opposing ends, a rolled configuration and a deployed configuration, the boom segment being flat and rolled along a widthwise axis in the rolled configuration and tubular and extended along a lengthwise axis in the deployed configuration, wherein said second boom segment stores elastic energy in the rolled configuration, the elastic energy effecting extension of the boom segment to the deployed configuration as the elastic energy is released, and further wherein at least one of the first and second opposing ends of the second boom segment is sized and shaped to be received by an end of the first boom segment.

14. The deployable boom structure according to claim 13 further comprising:

cutout portion defined in the second boom segment substantially near at least one of the first and second ends of the second boom segment, the cutout portion of the second boom segment defining a torque profile of the second boom segment at the region of the cutout portion, wherein the cutout portion of the second boom segment is in opposing orientation to the cutout portion of the first boom segment.

\* \* \* \* \*